United States Patent [19]

Takayama et al.

[11] Patent Number: 5,547,030
[45] Date of Patent: Aug. 20, 1996

[54] BRUSHING APPARATUS

[76] Inventors: Kazuya Takayama; Hidehiko Takayama, both of 860-16, Kamisakunobe, Takatsu-ku, Kawasaki-shi, Kanagawa 213, Japan

[21] Appl. No.: 375,358

[22] Filed: Jan. 19, 1995

[30] Foreign Application Priority Data

Jul. 29, 1994 [JP] Japan .................................... 6-197667
Nov. 18, 1994 [JP] Japan .................................... 6-309646

[51] Int. Cl.$^6$ .................................................. A01B 45/00
[52] U.S. Cl. ......................... 172/30; 172/612; 172/684.5
[58] Field of Search ................................ 172/29, 30, 39, 172/40, 101, 102, 103, 612, 684.5, 776; 15/78, 80, 87, 81

[56] References Cited

U.S. PATENT DOCUMENTS

| | | | |
|---|---|---|---|
| 354,011 | 12/1886 | Christoph | 15/78 |
| 1,421,060 | 6/1922 | Brook | 15/78 X |
| 1,997,248 | 4/1935 | Densberger | 172/612 |
| 3,851,921 | 12/1974 | Makishima | 172/612 |
| 4,097,953 | 7/1978 | McKinney et al. | |
| 4,989,676 | 2/1991 | Roger | 172/684.5 X |
| 5,018,587 | 5/1991 | Gandrud et al. | 172/612 |

FOREIGN PATENT DOCUMENTS

| | | | |
|---|---|---|---|
| 60-182704 | 12/1985 | Japan . | |
| 4-136005 | 12/1992 | Japan . | |
| 389285 | 4/1932 | United Kingdom . | |
| 766906 | 1/1957 | United Kingdom | 15/81 |

Primary Examiner—Terry Lee Melius
Assistant Examiner—Robert Pezzuto
Attorney, Agent, or Firm—Armstrong, Westerman, Hattori, McLeland & Naughton

[57] ABSTRACT

A brushing apparatus in which the quantity of sand grains to be poured into core holes will not fall short and is evenly swept thereinto for a favorable maintenance of the putting greens in golf courses. The brushing apparatus comprising: a leveling vehicle; a brush frame provided below the leveling vehicle, the brush frame having a brush mounted to an underside thereof; an oscillating frame for dividing the brush into plural bunches of bristles below the brush frame in the direction parallel to the traveling of the leveling vehicle; a driving mechanism for oscillating the oscillating frame in the direction perpendicular to the traveling of the leveling vehicle.

6 Claims, 6 Drawing Sheets

BRUSHING APPARATUS

BACKGROUND OF THE INVENTION

1. Field of the Invention

The present invention relates to an improvement in a brushing apparatus used for sleeping grains of sand, clay, etc. spread on the lawn of the putting greens in a golf course into previously formed core holes or alternatively for use in cleaning or waxing floors of buildings.

2. Description of the Related Art

Conventionally, the lawn of the putting greens in golf courses, for example, is cut at rhizomes thereof, in which cores are drawn to provide air to the roots of the lawn. After the cores are drawn, grains of sand, clay, etc. are swept into the core holes while brushes, disposed in more than two rows arranged in the direction that a vehicle travels, rub the grains of sand, clay, etc. while the brushes travel in a forward direction.

When the above-mentioned work was carried out in the past, sand grains etc. were spread on the lawn by a grain sprinkler, and the grains were rubbed to the bases of the lawn, which operation was manually performed with rake-like brushes.

It was recognized that the above-mentioned work requires a lot of manhours and can be inefficient. Therefore, it was suggested that such rake-like brushes be attached to a vehicle installed with a roller to carry out brushing for rubbing the sand grains etc. into the bases of the lawn and smoothing the surface of the lawn by the roller.

However, since the putting green in golf courses is not smooth or flat, and the growth and density of the lawn are different, the work to rub the grains to the bases of the lawn should be performed in consideration of the condition of the lawn. Further, the putting green is not a complete plane but is uneven on account of slopes, undulations, including upheavals and depressions, and it is impossible to level the putting green by a simple means.

In consideration of the above conditions, the present applicant developed a brushing device disclosed in Japanese Utility Model Application No. Heisei 3-53141, and a brushing apparatus disclosed in Japanese Utility Model Application No. Showa 59-70438, in which a first brush frame, to which a brush is attached on the under-side thereof, is connected to a second brush frame such that the second frame is vertically rotatable.

When the quantity of the grains is large, the brushes for rubbing the grains into the core holes yield to warp backward. On the other hand, when the quantity is small, the sand grains etc. moved by the brushes is small in quantity and the warpage experienced by the brushes is reduced; In either case, the quantity of the sand grains which is swept into the core holes is insufficient to completely fill the holes, thereby creating an annoyance to the players.

in addition, the grains moved by the brushes in such apparatus is swept into the core holes in such a manner that the grains are swept thereinto from a rearward direction in relation to the travel of the vehicle. As a result, the grains can collect one-sidedly to a rearward portion of the core holes in relation to the traveling direction and it is impossible to evenly fill the whole core hole space.

Further, if the position of the brush does not change in accordance with slopes, undulations including upheavals and depressions which are commonly provided on putting greens, the brush contact with the green face can be too strong or too weak depending on the locations. In other words, there is a problem that the sand grains are not evenly swepted into the core holes.

Then, the above-mentioned slopes and unevennesses of the green cause the brush to yield to warp rearwardly with respect to the traveling of the vehicle. As a result, the quantity of the grains moved in the direction that the vehicle travels is insufficient, resulting in insufficient quantity of the grains being placed in the core holes.

SUMMARY OF THE INVENTION

The present invention has been made to eliminate the drawbacks of the above-mentioned apparatus, and the object thereof is to provide a brushing apparatus in which the quantity of the grains of sand, clay, or the like, to be swept into core holes will not fall short and instead, is evenly put thereinto to provide favorable maintenance of the putting greens on golf courses.

Further, the second object of the present invention is to provide a brushing apparatus capable of maintaining substantially the same height of the brush frame from the top of the sand grains which is to be swept in the core holes; preventing the oscillating frame from contacting the ground through automatic control of the brush height, even if the green is provided with slopes or unevenness and preventing insufficient filling of the core holes due to substantial warp of the brush against the sand grains to be filled in.

The brushing apparatus according to the present invention has been made to solve the aforementioned problem. The apparatus comprises: a leveling vehicle; a brush frame provided below said vehicle, a brush mounted to an underside thereof; an oscillating frame separating the brush into plural bunches of bristles in a the direction parallel to the traveling of the vehicle below the brush frame; and driving means for oscillating the oscillating frame in the direction perpendicular to the traveling direction of the vehicle. Further, it is preferable to provide means for vertically moving the oscillating frame such that the oscillating frame moves close to, or apart from, the brush frame.

Further, in the brushing apparatus according to the present invention, it is preferable that the brushing apparatus is provided with a roller which contacts a slope on a traveling path, such as the putting green or the like, and moves the brush frame for leveling it to thereby reduce the warp of the brush mounted to the oscillating frame and extending in the direction perpendicular to the direction that the vehicle travels.

BRIEF DESCRIPTION OF THE DRAWINGS

The present invention will be more apparent from the ensuing description with reference to the accompanying drawing wherein.

DESCRIPTION OF PREFERRED EMBODIMENTS

A brushing apparatus according to the first embodiment of the present invention will be explained with reference to FIGS. 1 to 3.

In this embodiment, the brushing apparatus is mounted to a vehicle. As illustrated in FIG. 3, an elevator A for vertically moving each of the brush frames is mounted to a frame 1 of a leveling vehicle. After sand grains are swept into core holes by each of brushes, a rear wheel of the leveling vehicle functions as a roller also to press the ground and smoothen the lawn.

In the lower portion of an elevation frame 7 which is vertically moved by the elevator A and is finely adjustable in the vertical position thereof, is formed a guide slot 9, and a shaft 11 of the first rear brush frame 10, which is divided into sections in three rows in the direction perpendicular to the traveling direction of the vehicle, is slidably inserted into the guide slot 9. Although not shown, vertical shafts are attached to both right and left ends of the elevation frame 7, and upper end portions thereof are inserted into pipes, again not shown, downwardly extending from the frame 1. The elevation frame 7 is vertically movable but is not rotatable in the plane parallel to the ground.

The underside of the first rear brush frame 10 is formed in such a manner that the distance between said underside and the ground becomes gradually shorter in a rearward direction, and each portion of the underside of the frame 10 forms a stepped structure and is provided with two rows of brushes 12 and 13, respectively, to extend perpendicular to the traveling direction. The length of a number of bristles of the brushes 12 and 13 is gradually shorter in a rearward direction and the lowest ends thereof are on an identical level with each other. The first rear frame 10 is elevated by the elevation of a ram caused by the construction of a cylinder 6 attached to the elevator A to cause the brushes 12 and 13 to move apart from the ground.

The first rear brush frame 10 is lowered and the height thereof is subjected to fine adjustment through the elevator A, whereby the lowest ends of the brushes 12 and 13 are adjusted so as to contact the lawn growing ground to sweep the sand grains, or the like, spread thereon into the core holes. The bristles of the brushes 12 and 13 are different from each other in length, as well as in material and diameter thereof, so that those bristles contact the lawn in different manners, which permits brushing the sand grains etc. into the core holes to be properly carried out in accordance with the length and density of the lawn.

The second rear brush frame 14, which is divided into sections in three rows, like the first rear brush frame 10, is mounted to the leveling vehicle at a portion rearwardly of the brushes 12 and 13 taken in the direction that the vehicle travels. A shaft 16 of each of the divided sections of the second rear frame 14 is inserted into a vertically extending guide slot 15, whereby each section of the second rear brush frame 14 is vertically movable through the vertical movement of the shaft 16 in the guide slot 15 and is inclinable through the rotation of the shaft 16 in the guide slot 15 in relation to the first rear brush frame 10.

The elevation frame 7 is provided with three arms 17 projecting centrally above the respective upper portions of the second rear brush frame 14. Each arm 17 is provided with a guide hole into which a screw rod 18 mounted to substantially the center of each of the three sections of the second rear brush frame 14 is inserted. A spring 19 attached to the screw rod 18 functions as a compression spring between each section of the second rear brush frame 14 and each of the arms 17.

A nut 20 is engaged with the screw rod 18 at the top portion thereof over the arm 17, and the rotation of the nut 20 permits the height of the screw rod 18 from the arm 17 to be adjustable to control the pressure to the second rear brush frame 14 through the spring 19. With the above-mentioned construction, the spring pressure is increased so that the pressure to the ground through the second brush frame 14, in turn, is increased. In addition, the second rear brush frame 14 is adapted to roll and pitch in relation to the first rear brush frame 10.

The underside of the second rear brush frame 14 is formed generally flat where brushes 21 with the same length of bristles are disposed in three to five rows in the direction that the leveling vehicle travels and at the same intervals in the direction perpendicular to the traveling direction of the vehicle.

Each section of the second rear brush frame 14 will not lag in a rearward direction of the traveling of the vehicle or not be delayed in relation to the elevation frame 7 even when the resistance caused by the contact with the ground is present. Therefore, when the compressive pressure of the spring 19 is increased by the rotation of the nut 20, the sand grains etc. are swept into the core holes by a strong force applied by the brushes 21, and when the compressive strength is decreased, the sand grains are put into the core holes by a weaker force.

Moreover, not only the second rear brush frame 14 is vertically movable and inclinable in relation to the first rear brush frame 10 but also the second frame 14 is depressed with respect thereto whereby the second frame 14 causes the sand grains to be put into the core holes such that the overall surface thereof is in contact with the lawn with an adjusted contact force caused by the spring 19 even if there are slopes and upheaval on the ground where the lawn grows.

The shaft 11 of the first rear brush frame 10 is movable along the slant guide slot 9 of the elevation frame 7, whereby the first rear brush frame 10 is allowed to incline or lag in relation to the leveling vehicle in accordance with the inclination of the vehicle at a time of turning thereof, or the difference in a turning radius between outer and inner wheels.

In the brushing apparatus with the above-mentioned construction, when a large amount of sand grains, such as grains accumulated in more than 3 mm thickness, are spread on the putting greens into core holes after drawing cores, the brushes 12, 13 and 21 can yield to warp due to the large amount of sand grains with the result that the sand grains may insufficiently be rubbed between the lawn stems or swept into the core holes. In such a case, another stage of brush 23 may be added forwardly of the brush 12.

A front brush frame 25, to which the front brush 23 is attached, is divided into two sections right and left, and both sections thereof are arranged to overlap each other centrally of the vehicle and in the traveling direction of the vehicle to prevent brushless areas from being created between the right and left sections of the front brush frame 25.

To provide an aforementioned construction, rectangular-pipe-shaped connecting arms 24 are secured to the upper surface of the elevation frame 7 at two portions thereon on the right and left sides each so as to forwardly extend therefrom, and two mounting plates 26 with a distance therebetween slightly longer than the outer width of the connecting arm 24 is centrally provided on the front brush frame 25, to the underside of which the front brush 23 is attached to extend downwardly.

The mounting plate 28 is formed with a plurality of mounting holes 26a in a vertical line, and a mounting pin 27 is inserted into said mounting holes 26a and is secured therein. In case where the front brush 23 is not required to be used, the front brush frame 25 is lifted by inserting the mounting pin 27 into the connecting arm 24 and the lowest mounting hole 26a to maintain the front brush 23 clear away from the lawn.

A connecting plate 28 with a connecting hole 28a is attached to the front surface of the front brush frame 25 and a support arm 30 with a mounting pipe 29 is secured to the frame 1 of the vehicle. A connecting plate 31 which hangs from the mounting pipe 29 and the connecting plate 28, which is formed with the mounting pipe 29, are connected to each other by a traction arm 32 to prevent the front brush frame 25 from tilting in the traveling direction of the vehicle.

Figure 1:
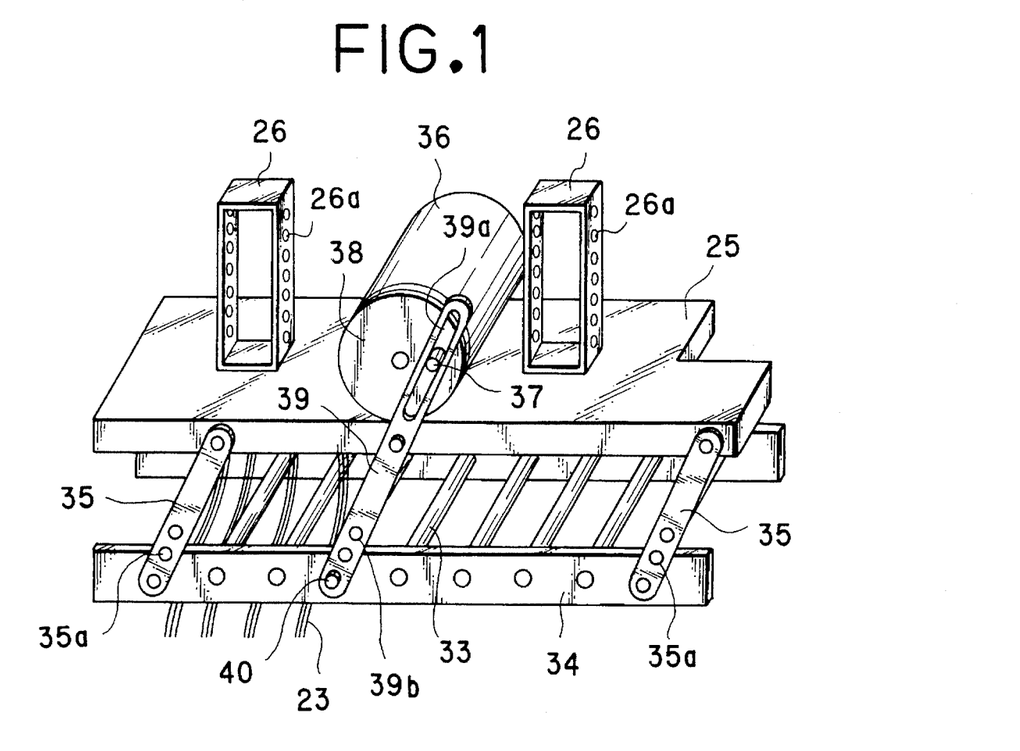
FIG. 1 is a perspective view of a brushing apparatus according to a first embodiment of the present invention.

Referring to FIG. 1, an oscillating frame 34 with partition rods 33 arranged at regular intervals corresponding to plural bunches of bristles of the front brushes 23 is provided with oscillating arms 35 at four locations, oscillate the oscillating frame 34 back and fourth to the right and left as shown in the draws. The oscillating frame 34 is supported between the lower ends of the front brush 23 and the front brush frame 25 by the oscillating arms 35 in such a manner that the bunches of bristles of the front brush 23 are separated by the partition rods 33. A plurality of mounting holes 35a are formed in a vertical line at lower portions of the oscillating arms 35 to support the oscillating frame 34 at selected positions.

A motor 36 is mounted to the upper side of the front brush frame 25 and a disk 38 with an eccentric connecting pin 37 is secured to a shaft of the motor 36. The connecting pin 37 of the disk 38 is inserted into a slot 39a of the connecting arm 39 which is rotatably supported by the front brush frame 25 through pins. Connection pins 40 of the oscillating frame 34 are inserted into a plurality of connecting holes 39b at the lower end portions of the connecting arms 39.

With the above-mentioned construction, the rotation of the motor 36 causes the disk 38 to rotate so that the connecting arms 39 oscillate about the supporting point thereof on the front brush frame 25 through the connecting pins 37, which allows the oscillating frame 34 to oscillate right and left through the connecting pins 40 inserted into the connecting holes 39b at the lower ends of the connecting arms 39. As a result, the lower ends of the front brushes 23 are moved right and left by the partition rods 33.

The movement described above is performed during the traveling of the leveling vehicle and the sand grains are put into the core holes while the lower ends of the front brush 23 levels the sand grains right and left. Unlike the conventional apparatus in which the sand grains are poured from behind only, in the apparatus according to the present invention, the sand grains are poured from both right and left sides, thereby preventing the sand grains from collecting one-sidedly in the core holes, resulting in even sand grain collection therein.

Further, it is possible to change the position of the oscillating frame 34 relative to the front brush 23 by changing the position of the connecting pins 40 in the plurality of connecting holes 39b on the connecting arms 39, permitting the distance to be varied between the lower end of the front brush 23 and the points where the brush 23 is moved by the oscillating frame 34.

Figure 2A:
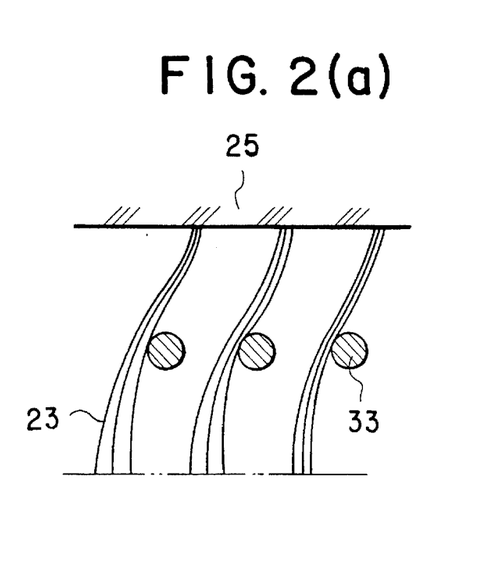
FIGS. 2*a* and 2*b* are front view showing the condition of the warp of brushes in two vertical positions of an oscillating.
Figure 2B:
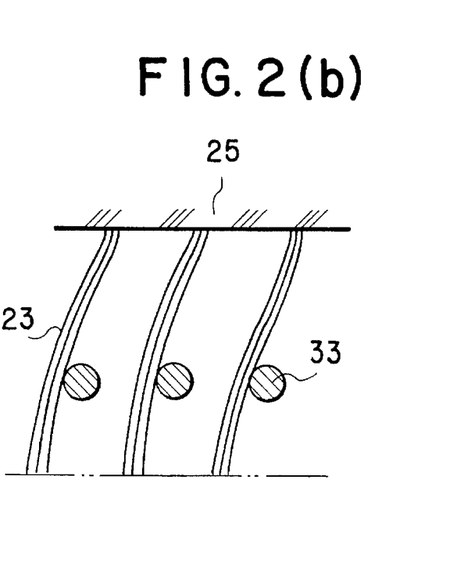
Figure 3:
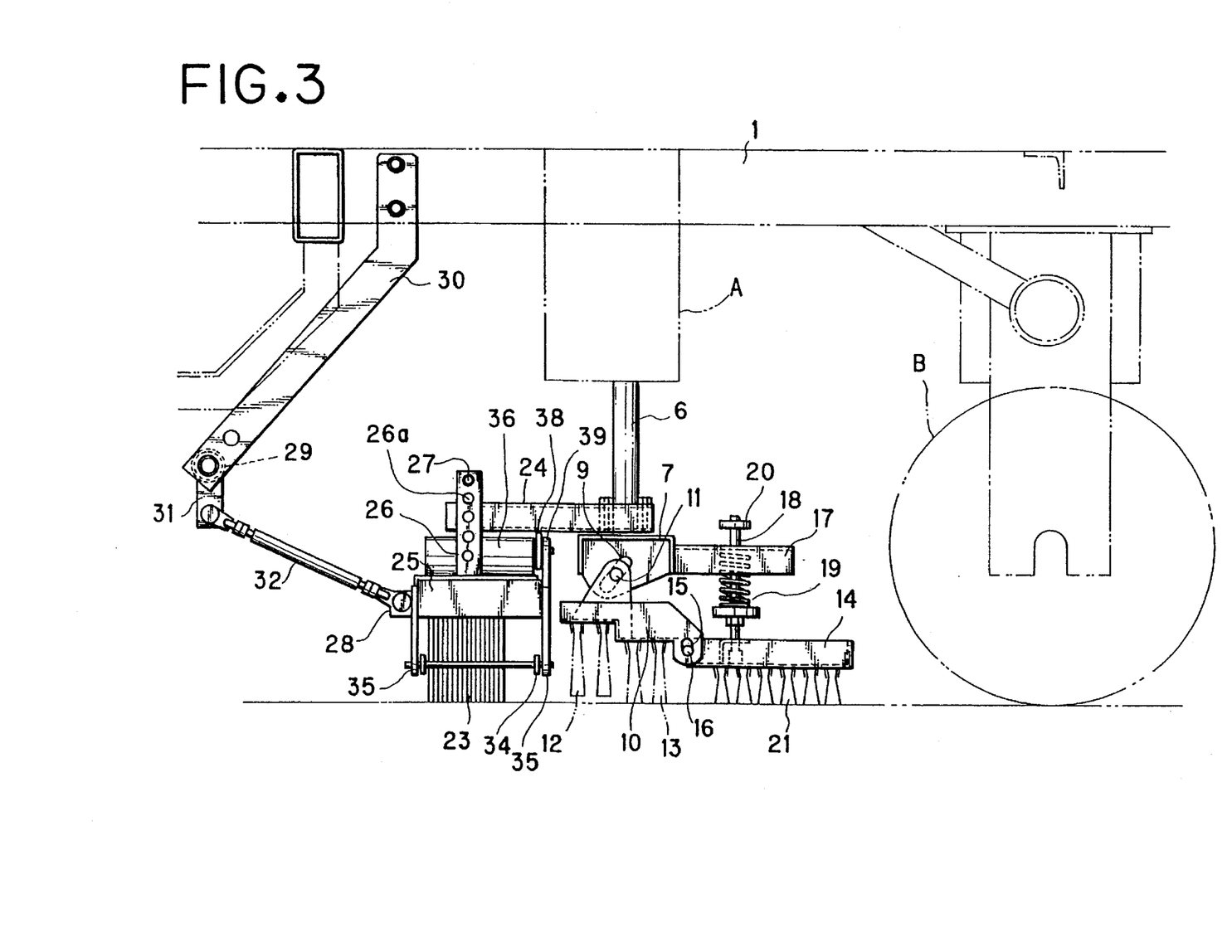
FIG. 3 is a side view of a vehicle with the brushing apparatus according to the present invention.
Figure 4:
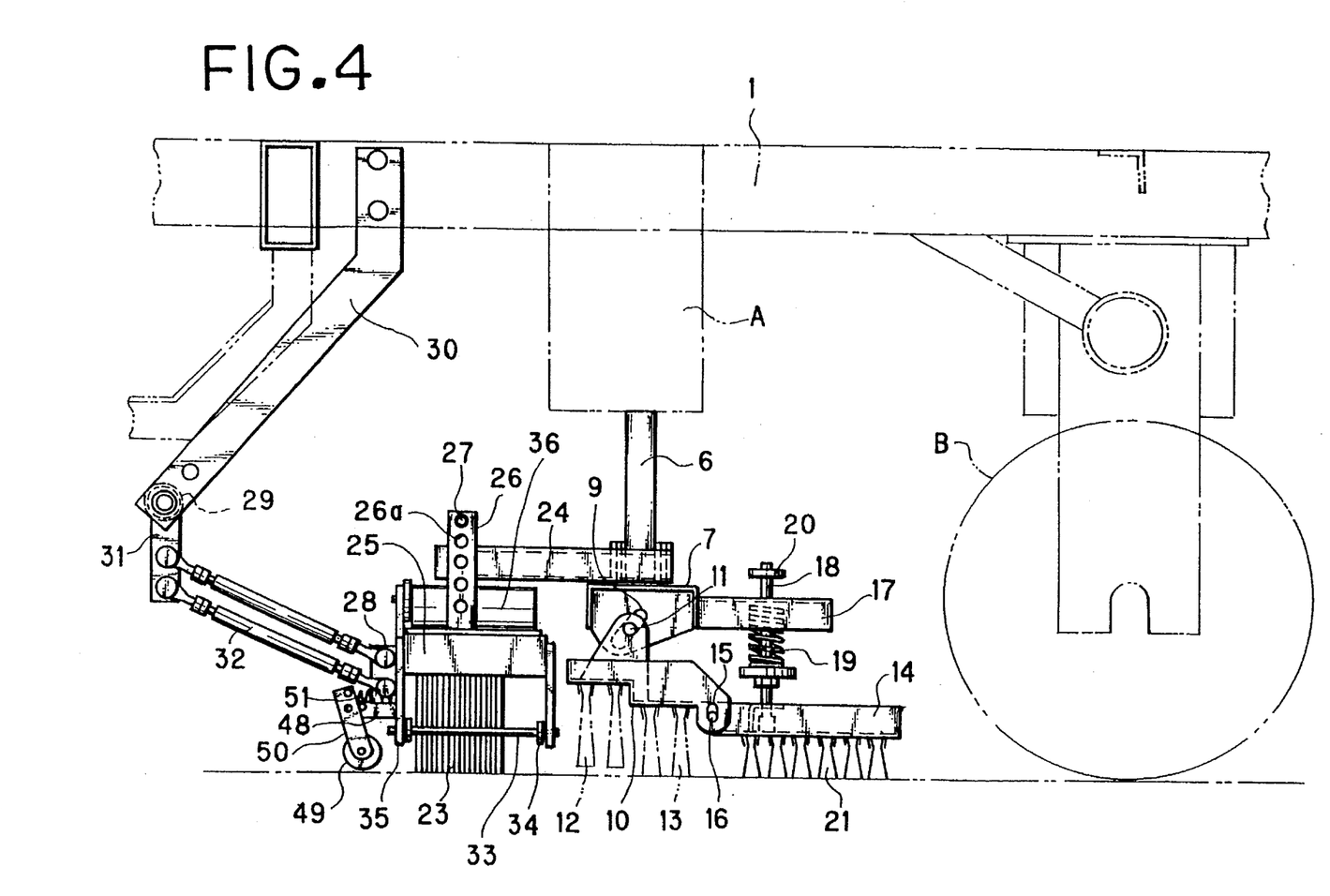
FIG. 4 is a side view of a brushing apparatus according to a second embodiment of the present invention.

As the above-mentioned distance becomes long, as illustrated in FIG. 2a, the length of the front brush 23, which warps between the sand accumulations and the points where the brush 23 contacts the partition rod 33 of the oscillating frame 34 becomes long, thereby to make the leveling force by the front brush 23 weaker, whereby a small amount of sand grains is swept into the cope holes. On the other hand, when this distance is short, the warp of the front brush 23 is limited and the force for leveling the sand grains becomes strong enough, which causes more sand grains to be swept in the core holes.

In the above embodiments, the motor 36 is independently mounted on the front brush frame 25 to oscillate the oscillating frame 34. However, it is possible to use the rotation of an engine for traveling the leveling vehicle in place of the motor 36. Further, the amplitude of oscillation of the frame 34 may be made variable regardless of the vertical position of the oscillating frame 34 whereas the vertical position of the oscillating frame 34 relative to the front brush 23 may be made variable regardless of the amplitude of the oscillation of the frame 34 depending upon the particle size, weight, amount and the like of the sand grains.

The second embodiment of the present invention will be explained with reference to FIGS. 4 to 7. In this embodiment, elements, except for those explained below, are the same as those in the first embodiment, therefore only the same reference symbols will be used for the elements and the explanation thereof will be omitted. In this embodiment, when a vertical force is applied to the front brush frame 25, the elevator A moves the piston 6 up and down in accordance with the elevated height of the brush frame to move the brushes 12, 13 and 21, as well as the front brush 23, up and down.

Figure 5:
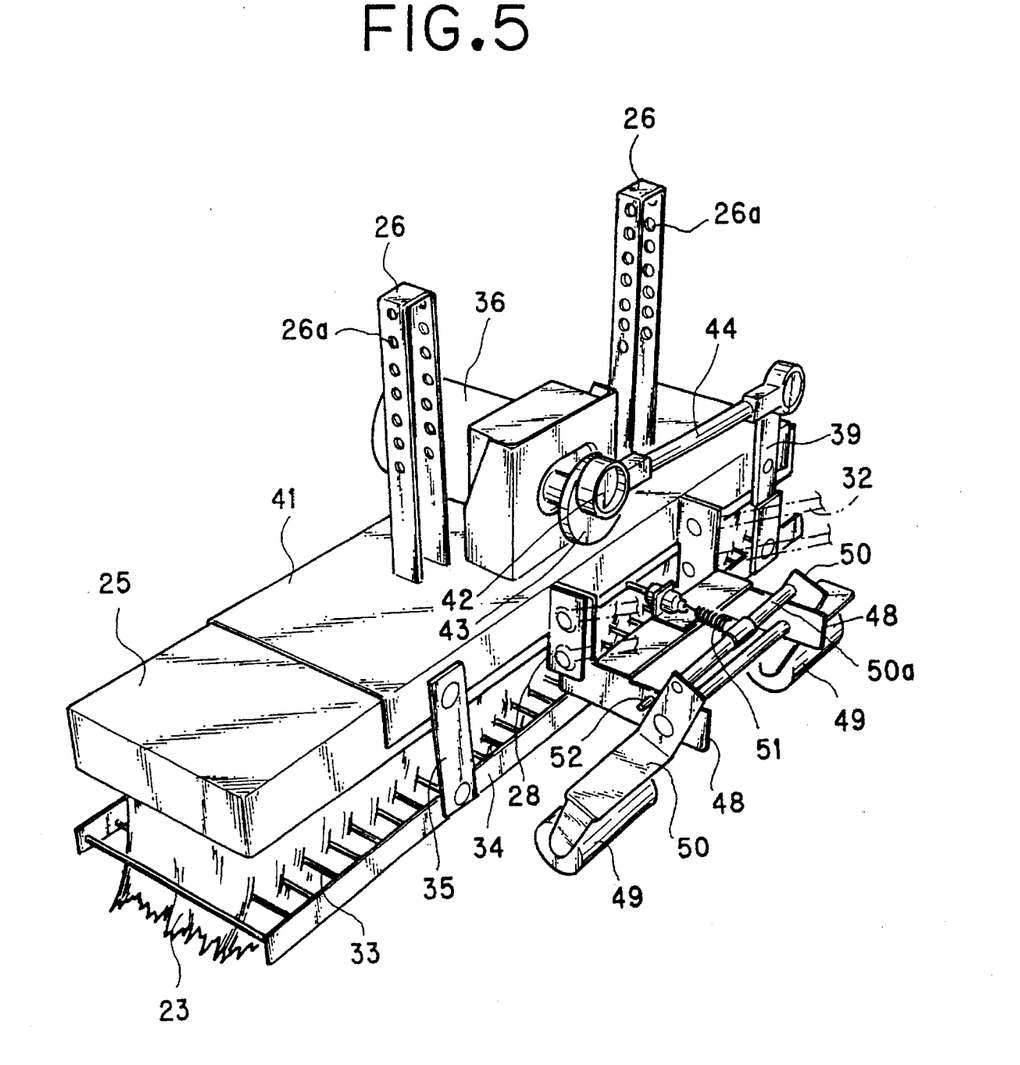
FIG. 5 is a perspective view of a primary portion of the brushing apparatus shown in FIG. 4.

The mounting pins 27 are inserted into the mounting holes 26a, and a U-shaped frame 41 is secured to the mounting plate 26 which is vertically movably mounted to the connecting arm 24. The front brush frame 25 with built-in front brushes 23 is secured to the U-shaped frame 41, and the motor 36 is mounted on the frame 41.

An eccentric disk 43 with an eccentric pin 42 thereon is attached to a shaft of the motor 36, and an end of a crank shaft 44 is engaged with the eccentric pin 42. Another end of the crank shaft 44 is connected to an upper end of the oscillating arm 39 which is supported at an end of the U-shaped frame 41 by a shaft. The rotation of the motor 36 causes the oscillating arm 35 to oscillate late about the shaft of the U-shaped frame 41.

The upper end of the oscillating frame 35 is supported on another side of the U-shaped frame 41 through a shaft, and the oscillating frame 34 supporting the front brush 23 while dividing the brush 23 in the direction of the traveling of the vehicle by the dividing rods 33 is attached to the lower end of the oscillating frame 35. The oscillation of the oscillating arm 35 causes the oscillating frame 34 to oscillate in the direction perpendicular to the traveling of the vehicle.

Figure 7:
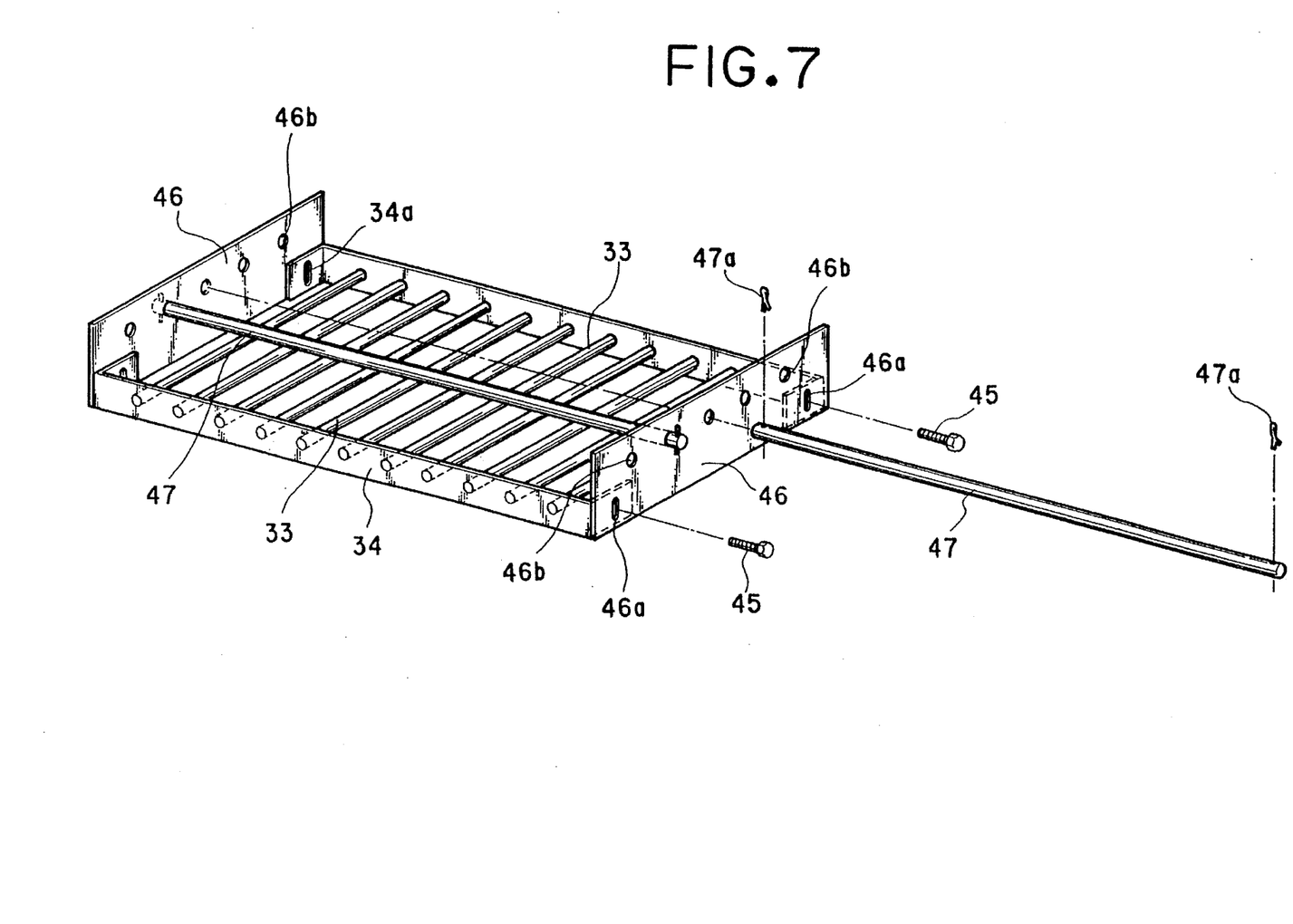
FIG. 7 is a perspective view of the oscillating frame in FIG. 6.

As illustrated in FIG. 7, bolt holes 34a are provided at bent portions 34 of the oscillating frame 34 at right and left ends thereof. A sub-oscillating frame 46, which is attached to the oscillating frame 34 through slots 36a and the bolts 45 engaging the bolt holes 34a, is provided with a plurality of insertion holes 46 in a line.

Warp-preventing levers 47 pass through the insertion holes 46b. After the levers 47 are inserted into the insertion holes 46b, split pins 47a are inserted into the warp-preventing lever 47 to mount it to the sub-oscillating frame 46, and the warp-preventing levers 47 separate the front brush 23 also in the direction of the traveling of the vehicle also.

Figure 6:
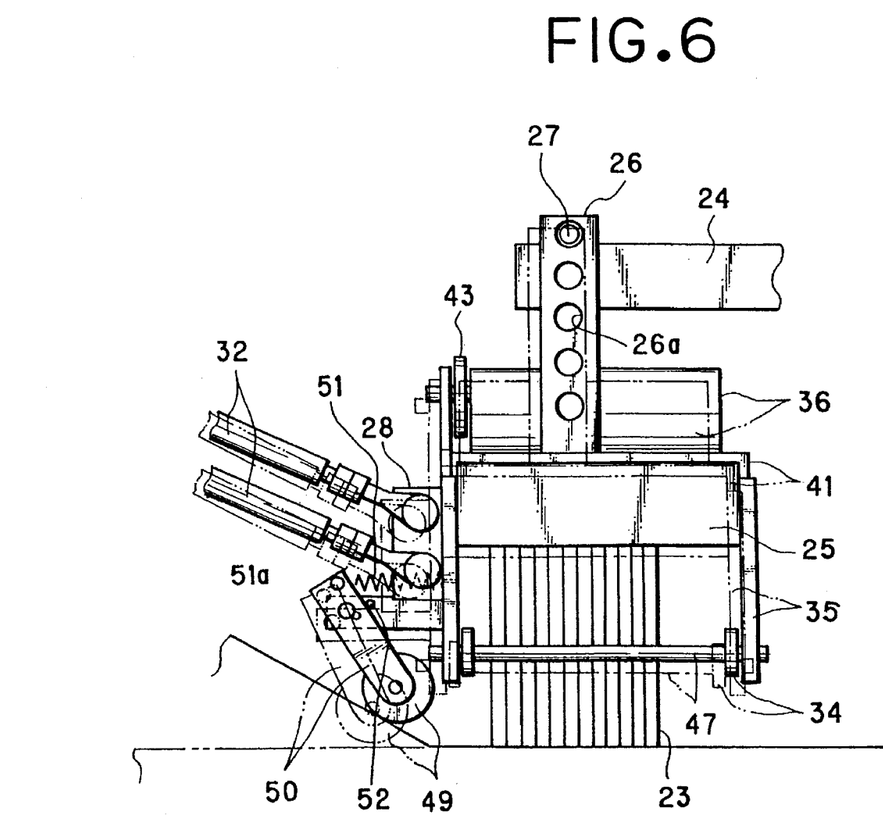
FIG. 6 is a side view of the brushing apparatus illustrated in FIG. 5.

Referring to FIG. 6, two connecting plates 28 are attached to the U-shaped frame 41 forwardly with respect to the traveling direction of the vehicle, and the traction arms 32 are mounted to the two connecting plates at the mounting holes thereof. Each of the two connecting plates 28 is provided with an L-shaped plate 48, and a roller plate 50 for supporting a roller 49 through a shaft is supported by each of the L-shaped plates 48 at the tip portion thereof through a shaft. The roller plates 50 are connected to each other at the upper portion thereof with a connecting lever 50a, and a tension spring 51 is mounted between the connecting lever 50a and the front brush frame 25.

As a result, the roller plates 50 are urged in a forward direction of the traveling of the vehicle. However, the urging is interrupted by stopper pins 52 installed in the L-shaped plates 48 to maintain the angle of the roller 50 constant.

In this vehicle, the heights of the brushes 12, 13 and 21 and the front brush 23 are adjusted by the elevator A such that the brushes 12, 13, 21 and 23 contact the green and rub the top of the green. The motor 36 is driven while the vehicle travels, and the oscillating frame 34 is are oscillated right and left to rub the sand grains sprinkled on the green right and left into the core holes. These operations in this embodiment are the same as those in the previous embodiment.

The vehicle travels while rubbing the clay. However, the green is not completely planar. At higher areas, the resistance of the sand grains to be swept in against the front brush 23 is large, thereby to cause the front brush 23 to warp in a rearward direction. As result, a power to sweep the sand grains into the core holes becomes too weak to sweep the sand grains into the core holes.

In this embodiment, the front brushes 23 are separated in the direction of the traveling of the vehicle by the warp-preventing levers 47 so that the front brush 23 resists to warping in a rearward direction of the traveling of the vehicle, thereby maintaining relatively strong contact between the brush 23 and the green. Right and left oscillations of the front brush 23 positively move the sand grains to reliably rub the sand grains into the core holes.

Then, the sub-oscillating frame 46 with the warp-preventing levers 47 is mounted to the oscillating frame 34 by engaging the bolts 45 inserted into the slots 46a with the bolt holes of the oscillating frame 34 so that the bolts 45 can be loosened to adjust the position of the sub-oscillating frame 46 up and down. As a result, when the quantity of the sand grains to be poured is large, or the sand grains are heavy, to such an extent that the front brush warp significantly and only a small quantity of sand grains is transported forwardly, the sub-oscillating frame 46 is adapted to be shifted in relation to the oscillating frame 34 such that the warp-preventing levers 47 are moved to the lower portion of the front brush 23 to reduce the warp of the brush 23 in order to increase the quantity of the sand grains to be swept.

Then, if an up-hill grade exists in a forward direction of the traveling of the vehicle, the roller 49 rotates in the direction that the tension spring 51 is extended. When the spring 51 is extended, the urging force acts in the direction that the brush frame 25 is pressed upward to elevate the brush frame 25.

As a result, if an up-hill grade is present on the putting green, the brush frame 25 is lifted in accordance with the inclination, which allows the oscillating frame 34 to integrally rise with the brush frame 25 to prevent the oscillating frame 34 from contacting the green surface. As a result, gouges on the green surface caused by the oscillating frame 34 are avoided.

In the above-mentioned embodiments, the explanation was made when the putting green in golf courses is tended to. However, it is needless to say that the device according to the present invention can be applied to the cleaning or waxing of buildings, the cleaning or maintenance of artificial lawns, and the like.

As described above, in the construction of the brushing apparatus according to the present invention, the sand grains to be swept into the core holes are leveled from the right and left sides, whereby the sand grains are evenly swept in the overall entire core hole spaces such that no open space in the core holes is produced, that is, one-sided sand grain accumulation in the core holes, which is liable to occur when the sand grains are swept in one direction only, is prevented.

Further, it is possible to vary the length of moving portion of the front brush or the warp of this portion through the vertical movement of the oscillating frame, which permits the condition of the front brush at the leveling to be changed. As a result, the apparatus according to the present invention provides maintenance work on the putting green in accordance with the hardness, amount, and the like, of the sand grains, which provides effects, such as evenly poured sand grains, regardless of the conditions thereof.

Moreover, the brush frame can be provided with a roller which vertically moves, together with the brush frame, in a forward direction of the traveling of the vehicle. As a result, the inclination of the green causes the brush frame to automatically move up and down to cope with the conditions, such as slopes and undulations including upheavals and depressions, thereby preventing gouging caused by the oscillating frame when contacting the green surface, and the contact between the brush and the green surface is maintained constant so that the sand grains are favorably swept in the core holes even on an uneven green surface.

In the brushing apparatus according to the present invention, oscillating means are mounted to an oscillating frame, which passes through a brush to divide it into plural bunches of bristles, to oscillate the frame right and left. As a result, the sand grains are put into core holes from right and left sides with the cope portion in between, which allows the sand grains to be swept evenly into the entire core hole spaces.

Further, the position of the oscillating frame relative to the brush is changeable, thereby the shift of the lower end of the brush the right and left directions and the extent of the warp are made variable. As a result, the brushing apparatus is operated in accordance with the change of resistance against the sweeping of the sand grains, such as quantity and weight of the sand grains to be swept.

Then, the roller attached to the brushing frame transmits the vertical movement of the roller in accordance with the unevenness of the green to the brush frame, which accommodates the brushing apparatus to the inclination of the green and the change in height thereof. Further, the contact of the oscillating frame to the green surface is prevented. Insufficient sweeping of the sand grains is prevented by maintaining the warp of the brush at a predetermined angle using the levers.

Even if the contact of the brush to the green surface is too strong so that the brush warp rearwardly to make the sweep of the sand grains into the core holes insufficient, the warp-preventing levers mounted to the oscillating frame divide the brush in the direction of the traveling of the vehicle. As a result, the backward warp of the brush are kept below a predetermined angle with the result, for example, that said sand grains is always favorably swept into the core holes.

What is claimed is:

1. A brushing apparatus comprising:

a leveling vehicle;

a brush frame fixedly secured to said vehicle, said brush frame having a brush containing bristles having fixed ends mounted to an underside of said brush frame and free ends projecting therebelow;

an oscillating frame extending below the brush frame and having means for separating said brush into plural bunches of bristles in a direction parallel to a traveling direction of the leveling vehicle; and driving means for oscillating the oscillating frame in a direction perpendicular to the traveling direction of the leveling vehicle, whereby said bristles are moved transversely from side-to-side with respect to said vehicle traveling direction.

2. The brushing apparatus as claimed in claim 1, wherein said brush frame is mounted to said leveling vehicle for vertical adjustment with respect thereto.

3. The brushing apparatus as claimed in claim 1, further comprising means for adjustably positioning said oscillating frame with respect to said brush frame.

4. The brushing apparatus as claimed in claim 1 including means for maintaining said brush frame with respect to a surface being swept, said means, comprising a surface sensing roller mounted to said brush frame forwardly, thereof and being operative to move said brush frame upwardly when said vehicle travels on an ascending slope.

5. The brushing apparatus as claimed in claim 4, including spring means attached between said brush frame and a support for said roller, whereby said brush frame is moved upward through an urging force of said spring means when said vehicle travels on said ascending slope.

6. The brushing apparatus as claimed in claim 1, further comprising levers for preventing the bristles of said brush from warping, said levers being attached to said oscillating frame and extending through said brush bristles in a direction perpendicular to the direction in which the leveling vehicle travels.

* * * * *